US012584015B2

(12) United States Patent
Sato et al.

(10) Patent No.: US 12,584,015 B2
(45) **Date of Patent: *Mar. 24, 2026**

(54) POLYIMIDE RESIN COMPOSITION

(71) Applicant: MITSUBISHI GAS CHEMICAL COMPANY, INC., Chiyoda-ku (JP)

(72) Inventors: Yuuki Sato, Kanagawa (JP); Atsushi Sakai, Kanagawa (JP)

(73) Assignee: MITSUBISHI GAS CHEMICAL COMPANY, INC., Chiyoda-ku (JP)

( * ) Notice: Subject to any disclaimer, the term of this patent is extended or adjusted under 35 U.S.C. 154(b) by 681 days.

This patent is subject to a terminal disclaimer.

(21) Appl. No.: 17/047,280

(22) PCT Filed: May 8, 2019

(86) PCT No.: PCT/JP2019/018366
§ 371 (c)(1),
(2) Date: Oct. 13, 2020

(87) PCT Pub. No.: WO2019/220966
PCT Pub. Date: Nov. 21, 2019

(65) Prior Publication Data
US 2021/0139701 A1 May 13, 2021

(30) Foreign Application Priority Data
May 17, 2018 (JP) ................................ 2018-095744

(51) Int. Cl.
*C08L 79/08* (2006.01)
*C08G 73/10* (2006.01)
*C08K 7/14* (2006.01)
*C08K 9/04* (2006.01)

(52) U.S. Cl.
CPC .......... *C08L 79/08* (2013.01); *C08G 73/1082* (2013.01); *C08K 7/14* (2013.01); *C08K 9/04* (2013.01)

(58) Field of Classification Search
None
See application file for complete search history.

(56) References Cited

U.S. PATENT DOCUMENTS

| | | | | |
|---|---|---|---|---|
| 8,927,678 | B2 * | 1/2015 | Sato | C08G 73/1046 428/458 |
| 10,093,789 | B2 * | 10/2018 | Sato | C08K 3/22 |
| 10,131,748 | B2 * | 11/2018 | Sato | C08J 5/04 |
| 10,174,167 | B2 * | 1/2019 | Sato | C08G 73/1075 |
| 2005/0048299 | A1 * | 3/2005 | Gallucci | C08K 5/42 428/473.5 |
| 2010/0120972 | A1 | 5/2010 | Yuan | |
| 2014/0200325 | A1 | 7/2014 | Sato et al. | |
| 2016/0159984 | A1 | 6/2016 | Sato et al. | |
| 2016/0168329 | A1 | 6/2016 | Sato et al. | |

(Continued)

FOREIGN PATENT DOCUMENTS

| | | | |
|---|---|---|---|
| CN | 105377949 | A | 3/2016 |
| JP | 2002-179913 | A | 3/2002 |

(Continued)

OTHER PUBLICATIONS

Oertel, G., "Polyurethane Handbook", China Petrochemical Press, 1992, (with unedited computer-generated English translation), p. 409, 8 pages.
International Search Report issued Jul. 23, 2019 in PCT/JP2019/018366 filed May 8, 2019, 2 pages.

*Primary Examiner* — Satya B Sastri
(74) *Attorney, Agent, or Firm* — Oblon, McClelland, Maier & Neustadt, L.L.P.

(57) ABSTRACT

A polyimide resin composition obtained by blending a polyimide resin (A) and glass fiber (B), the polyimide resin (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %, wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

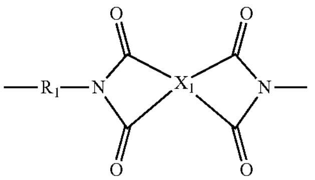

(1)

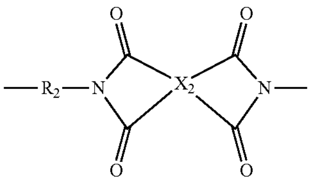

(2)

14 Claims, No Drawings

(56) References Cited

U.S. PATENT DOCUMENTS

| | | | | |
|---|---|---|---|---|
| 2016/0177062 | A1* | 6/2016 | Sato | C08K 3/346 524/451 |
| 2017/0130003 | A1* | 5/2017 | Sato | C08G 73/1017 |
| 2017/0275425 | A1 | 9/2017 | Sato | |

FOREIGN PATENT DOCUMENTS

| | | | |
|---|---|---|---|
| JP | 2005-28524 | A | 2/2005 |
| JP | 5365762 | B1 | 12/2013 |
| WO | WO 2013/118704 | A1 | 8/2013 |
| WO | WO 2015/020016 | A1 | 2/2015 |
| WO | WO 2015/020020 | A1 | 2/2015 |
| WO | WO 2016/147996 | A1 | 9/2016 |
| WO | WO 2016/147997 | A1 | 9/2016 |

* cited by examiner

POLYIMIDE RESIN COMPOSITION

TECHNICAL FIELD

The present invention relates to a polyimide resin composition.

BACKGROUND ART

A polyimide resin is a useful engineering plastic that has high thermal stability, high strength and high solvent resistance due to rigidity, resonance stabilization and firm chemical bond of the molecular chain thereof, and is being applied to a wide range of fields. A polyimide resin having crystallinity is further enhanced in the heat resistance, the strength and the chemical resistance thereof, and thus is expected for applications as alternatives of metals or the like. While a polyimide resin has high heat resistance, however, it has the problems of exhibiting no thermoplasticity and having low molding process ability.

Vespel (registered trademark), a highly heat-resistant resin, is known as a polyimide molding material (PTL 1). This resin is difficult to process by molding due to its very low flowability even at a high temperature, and is also disadvantageous in terms of cost because it requires molding under conditions of a high temperature and a high pressure for a prolonged period of time. In contrast to this, a resin having a melting point and flowability at a high temperature, such as a crystalline resin, may be processed by molding easily and inexpensively.

Thus, a polyimide resin having thermoplasticity has been reported in recent years. Such a thermoplastic polyimide resin is excellent in molding processability in addition to the original heat resistance of the polyimide resin. The thermoplastic polyimide resin is therefore applicable to a molded article for use in an inhospitable environment to which nylon or polyester, a general purpose thermoplastic resin, is inapplicable.

For example, PTL 2 discloses a thermoplastic polyimide resin containing a predetermined repeating structural unit, wherein the resin is obtained by reacting a tetracarboxylic acid containing at least one aromatic ring and/or a derivative thereof, a diamine containing at least one alicyclic hydrocarbon structure, and a chain aliphatic diamine.

CITATION LIST

Patent Literature

PTL 1: JP-A-2005-28524
PTL 2: WO2013/118704

SUMMARY OF INVENTION

Technical Problem

However, although thermoplastic polyimide resins containing an aliphatic structure are excellent in molding processability, such resins tend to be inferior in heat resistance and strength to aromatic polyimide resins.

An object of the present invention is to provide a polyimide resin composition having molding processability and also having an excellent balance between heat resistance and mechanical strength.

Solution to Problem

The present inventors have found that the aforementioned object can be attained by a polyimide resin composition obtained by blending a polyimide resin containing particular different polyimide structural units combined at a particular ratio and glass fiber.

That is, the present invention provides a polyimide resin composition obtained by blending a polyimide resin (A) and glass fiber (B), the polyimide resin (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

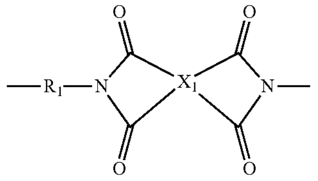

(1)

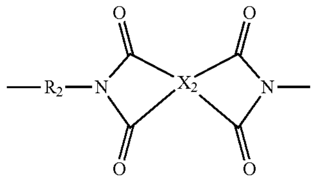

(2)

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

Advantageous Effects of Invention

The polyimide resin composition of the present invention is excellent in molding processability as well as having a good balance between heat resistance and mechanical strength. The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like. The molded articles, which are excellent in heat resistance and mechanical strength, also can replace various metals including aluminum alloys and magnesium alloys.

DESCRIPTION OF EMBODIMENTS

[Polyimide Resin Composition]

The polyimide resin composition of the present invention is a resin composition obtained by blending a polyimide resin (A) and glass fiber (B), the polyimide resin (A) containing a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

(1)

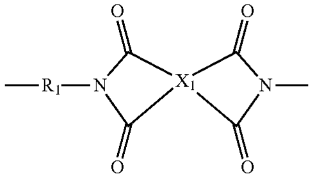

(2)

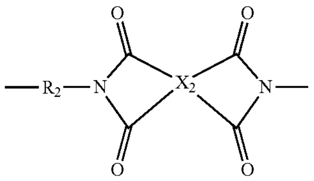

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin composition of the present invention is a composition obtained by blending a polyimide resin (A) containing particular different polyimide structural units combined at a particular ratio described above and glass fiber (B). The polyimide resin (A) develops thermoplasticity because of having the particular structure described above, and thus, the resin composition containing the polyimide resin (A) is excellent in molding processability. Further, the polyimide resin (A) also has high crystallinity because of having the particular structure described above and thus has a high reinforcing effect due to mixing of the glass fiber (B). Then, the heat resistance and mechanical strength are significantly enhanced. Accordingly, the polyimide resin composition of the present invention is excellent in molding processability as well as has a good balance between heat resistance and mechanical strength. Further, mixing the glass fiber (B) makes the slidability better.

<Polyimide Resin (A)>

The polyimide resin (A) used in the present invention contains a repeating structural unit represented by the following formula (1) and a repeating structural unit represented by the following formula (2), a content ratio of the repeating structural unit of the formula (1) with respect to the total of the repeating structural unit of the formula (1) and the repeating structural unit of the formula (2) being 20 to 70 mol %:

(1)

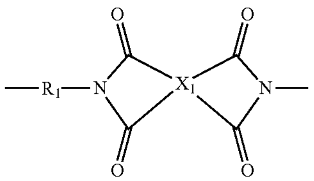

-continued (2)

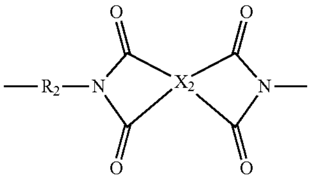

wherein $R_1$ represents a divalent group having from 6 to 22 carbon atoms containing at least one alicyclic hydrocarbon structure; $R_2$ represents a divalent chain aliphatic group having from 5 to 16 carbon atoms; and $X_1$ and $X_2$ each independently represent a tetravalent group having from 6 to 22 carbon atoms containing at least one aromatic ring.

The polyimide resin (A) used in the present invention is a thermoplastic resin, which is preferably in a powder or pellet form. The thermoplastic polyimide resin is distinguished from, for example, polyimide resins formed by closing the imide ring after shaping in a state of a polyimide precursor such as a polyamic acid and having no glass transition temperature (Tg), or polyimide resins that decompose at a temperature lower than the glass transition temperature.

The repeating structural unit of formula (1) will be described in detail below.

$R_1$ represents a divalent group having from 6 to 22 carbon atoms containing at least one alicyclic hydrocarbon structure. The alicyclic hydrocarbon structure herein means a ring derived from an alicyclic hydrocarbon compound, and the alicyclic hydrocarbon compound may be either saturated or unsaturated and may be either monocyclic or polycyclic.

Examples of the alicyclic hydrocarbon structure include a cycloalkane ring, such as a cyclohexane ring, a cycloalkene ring, such as cyclohexene, a bicycloalkane ring, such as a norbornane ring, and a bicycloalkene ring, such as norbornene, but the alicyclic hydrocarbon structure is not limited thereto. Among these, a cycloalkane ring is preferred, a cycloalkane ring having from 4 to 7 carbon atoms is more preferred, and a cyclohexane ring is further preferred.

$R_1$ has from 6 to 22 carbon atoms, and preferably from 8 to 17 carbon atoms.

$R_1$ contains at least one alicyclic hydrocarbon structure, and preferably from 1 to 3 alicyclic hydrocarbon structures.

$R_1$ is preferably a divalent group represented by the following formula (R1-1) or (R1-2):

(R1-1)

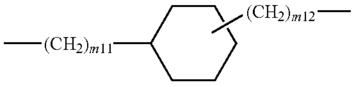

(R1-2)

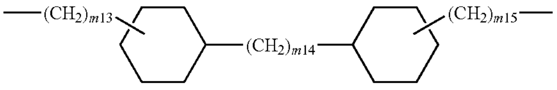

wherein $m_{11}$ and $m_{12}$ each independently represent an integer of 0-2, and preferably 0 or 1; and $m_{13}$ to $m_{15}$ each independently represent an integer of 0-2, and preferably 0 or 1.

$R_1$ is particularly preferably a divalent group represented by the following formula (R1-3):

(R1-3)

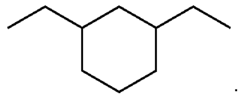

In the divalent group represented by the formula (R1-3), the conformation of the two methylene groups with respect to the cyclohexane ring may be either cis or trans, and the ratio of cis and trans may be an arbitrary value.

$X_1$ is a tetravalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$X_1$ has from 6 to 22 carbon atoms, and preferably has from 6 to 18 carbon atoms.

$X_1$ contains at least one aromatic ring, and preferably contains from 1 to 3 aromatic rings.

$X_1$ is preferably a tetravalent group represented by one of the following formulae (X-1) to (X-4):

(X-1)

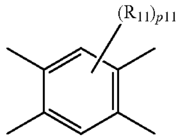

(X-2)

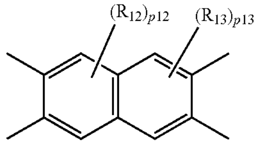

(X-3)

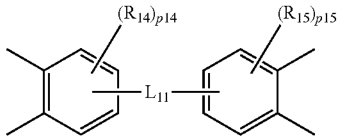

(X-4)

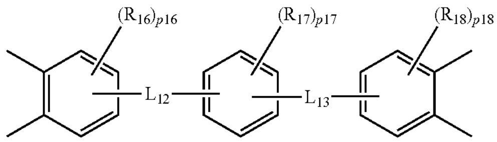

wherein $R_{11}$ to $R_{18}$ each independently represent an alkyl group having from 1 to 4 carbon atoms; $p_{11}$ to $p_{13}$ each independently represent an integer of 0-2, and preferably 0; $p_{14}$, $p_{15}$, $p_{16}$ and $p_{18}$ each independently represent an integer of 0-3, and preferably 0; $p_{17}$ represents an integer of 0-4, and preferably 0; and $L_{11}$ to $L_{13}$ each independently represent a single bond, an ether group, a carbonyl group or an alkylene group having from 1 to 4 carbon atoms.

$X_1$ is a tetravalent group having from 6 to 22 carbon atoms containing at least one aromatic ring, and therefore $R_{12}$, $R_{13}$, $p_{12}$ and $p_{13}$ in the formula (X-2) are selected in such a manner that the tetravalent group represented by the formula (X-2) has from 10 to 22 carbon atoms.

Similarly, $L_{11}$, $R_{14}$, $R_{15}$, $p_{14}$ and $p_{15}$ in the formula (X-3) are selected in such a manner that the tetravalent group represented by the formula (X-3) has from 12 to 22 carbon atoms, and $L_{12}$, $L_{13}$, $R_{16}$, $R_{17}$, $R_{18}$, $p_{16}$, $p_{17}$ and $p_{18}$ in the formula (X-4) are selected in such a manner that the tetravalent group represented by the formula (X-4) has from 18 to 22 carbon atoms.

$X_1$ is particularly preferably a tetravalent group represented by the following formula (X-5) or (X-6):

(X-5)

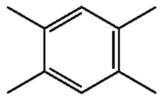

(X-6)

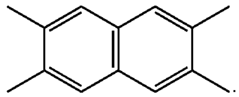

Next, the repeating structural unit of formula (2) will be described in detail below.

$R_2$ represents a divalent chain aliphatic group having from 5 to 16 carbon atoms, preferably from 6 to 14 carbon atoms, more preferably from 7 to 12 carbon atoms, and further preferably from 8 to 10 carbon atoms. The chain aliphatic group herein means a group derived from a chain aliphatic compound, and the chain aliphatic compound may be either saturated or unsaturated, may be in the form of either linear or branched chain, and may contain a hetero atom, such as an oxygen atom.

$R_2$ is preferably an alkylene group having from 5 to 16 carbon atoms, more preferably an alkylene group having from 6 to 14 carbon atoms, further preferably an alkylene group having from 7 to 12 carbon atoms, and particularly preferably an alkylene group having from 8 to 10 carbon atoms. The alkylene group may be either a linear alkylene group or a branched alkylene group, and is preferably a linear alkylene group.

$R_2$ preferably represents at least one selected from the group consisting of an octamethylene group and a decamethylene group, and particularly preferably represents an octamethylene group.

Another preferred embodiment of $R_2$ is a divalent chain aliphatic group having from 5 to 16 carbon atoms containing an ether group. The divalent chain aliphatic group preferably has from 6 to 14 carbon atoms, more preferably from 7 to 12 carbon atoms, and further preferably from 8 to 10 carbon atoms. Preferred examples of the group include a divalent group represented by the following formula (R2-1) or (R2-2):

$$-(CH_2)_{m21}-O-(CH_2)_{m22}- \quad (R2\text{-}1)$$

$$-(CH_2)_{m23}-O-(CH_2)_{m24}-O-(CH_2)_{m25}- \quad (R2\text{-}2)$$

wherein $m_{21}$ and $m_{22}$ each independently represent an integer of 1-15, preferably 1-13, more preferably 1-11, and further preferably 1-9; and $m_{23}$ to $m_{25}$ each independently represent an integer of 1-14, preferably 1-12, more preferably 1-10, and further preferably 1-8.

$R_2$ represents a divalent chain aliphatic group having from 5 to 16 carbon atoms (preferably from 6 to 14 carbon atoms, more preferably from 7 to 12 carbon atoms, and further preferably from 8 to 10 carbon atoms), and therefore $m_{21}$ and $m_{22}$ in the formula (R2-1) are selected so that the divalent group represented by the formula (R2-1) has from 5 to 16 carbon atoms (preferably from 6 to 14 carbon atoms, more preferably from 7 to 12 carbon atoms, and further preferably from 8 to 10 carbon atoms), i.e., $m_{21}+m_{22}$ is from 5 to 16 (preferably 6 to 14, more preferably 7 to 12, and further preferably 8 to 10).

Similarly, $m_{23}$ to $m_{25}$ in the formula (R2-2) are selected so that the divalent group represented by the formula (R2-2) has from 5 to 16 carbon atoms (preferably from 6 to 14 carbon atoms, more preferably from 7 to 12 carbon atoms, and further preferably from 8 to 10 carbon atoms), i.e., $m_{23}+m_{24}+m_{25}$ is from 5 to 16 (preferably from 6 to 14 carbon atoms, more preferably from 7 to 12 carbon atoms, and further preferably from 8 to 10 carbon atoms).

$X_2$ is defined similarly to $X_1$ in the formula (1), and preferred embodiments thereof are also the same.

The content ratio of the repeating structural unit of the formula (1) with respect to the total of the repeating structural unit of the formula (1) and the repeating structural unit of the formula (2) is 20 mol % to 70 mol %. In the case where the content ratio of the repeating structural unit of the formula (1) is in the above range, the polyimide resin may also be sufficiently crystallized in an ordinary injection molding cycle. When the content ratio is less than 20 mol %, molding processability is deteriorated, and when the content ratio is more than 70 mol %, crystallinity is deteriorated to thereby result in deterioration in heat resistance.

The content ratio of the repeating structural unit of the formula (1) with respect to the total of the repeating structural unit of the formula (1) and the repeating structural unit of the formula (2) is preferably 65 mol % or less, more preferably 60 mol % or less, and further preferably 50 mol % or less in consideration of exerting high crystallinity.

Among these, the content ratio of the repeating structural unit of the formula (1) with respect to the total of the repeating structural unit of the formula (1) and the repeating structural unit of the formula (2) is preferably 20 mol % or more and less than 40 mol %. When the ratio falls within this range, the crystallinity of the polyimide resin (A) increases, and it is possible to obtain a resin composition having a significant effect of improving physical properties due to mixing of the glass fiber (B) mentioned later and being more excellent in heat resistance.

The content ratio described above is preferably 25 mol % or more, more preferably 30 mol % or more, further preferably 32 mol % or more in consideration of molding processability, and is further preferably 35 mol % or less in consideration of exerting high crystallinity.

The content ratio of the total of the repeating structural unit of the formula (1) and the repeating structural unit of the formula (2) with respect to the total repeating structural units constituting the polyimide resin (A) is preferably 50 to 100 mol %, more preferably 75 to 100 mol %, further preferably 80 to 100 mol %, and still further preferably 85 to 100 mol %.

The polyimide resin (A) may further contain a repeating structural unit represented by the following formula (3). In this case, the content ratio of the repeating structural unit of formula (3) with respect to the total of the repeating structural unit of formula (1) and the repeating structural unit of formula (2) is preferably 25 mol % or less. The lower limit thereof is not particularly limited but needs to exceed 0 mol %.

The content ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

(3)

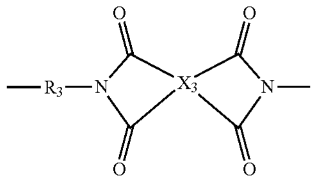

wherein $R_3$ represents a divalent group having from 6 to 22 carbon atoms containing at least one aromatic ring; and $X_3$ represents a tetravalent group having from 6 to 22 carbon atoms containing at least one aromatic ring.

$R_3$ is a divalent group having from 6 to 22 carbon atoms containing at least one aromatic ring. The aromatic ring may be either a monocyclic ring or a condensed ring, and examples thereof include a benzene ring, a naphthalene ring, an anthracene ring and a tetracene ring, but the aromatic ring is not limited thereto. Among these, a benzene ring and a naphthalene ring are preferred, and a benzene ring is more preferred.

$R_3$ has from 6 to 22 carbon atoms, and preferably has from 6 to 18 carbon atoms.

$R_3$ contains at least one aromatic ring, and preferably contains from 1 to 3 aromatic rings.

The aromatic ring may also be bonded to a monovalent or divalent electron-attracting group. Examples of the monovalent electron-attracting group include a nitro group, a cyano group, a p-toluenesulfonyl group, halogen, an alkyl halide group, a phenyl group, and an acyl group. Examples of the divalent electron-attracting group include alkylene halide groups such as alkylene fluoride groups (e.g., $—C(CF_3)_2—$ and $—(CF_2)_p—$ (wherein p is an integer of 1-10), as well as —CO—, $—SO_2—$, —SO—, —CONH—, and —COO—.

$R_3$ is preferably a divalent group represented by the following formula (R3-1) or (R3-2);

(R3-1)

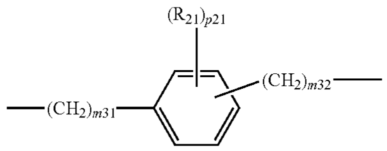

(R3-2)

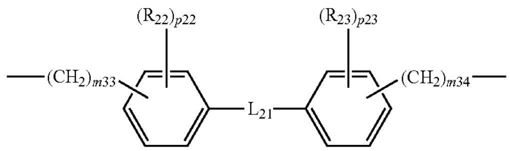

wherein $m_{31}$ and $m_{32}$ each independently represent an integer of 0-2, and preferably 0 or 1; $m_{33}$ and $m_{34}$ each independently represent an integer of 0-2, and preferably 0 or 1; $R_{21}$, $R_{22}$ and $R_{23}$ each independently represent an alkyl group having from 1 to 4 carbon atoms, an alkenyl group having from 2 to 4 carbon atoms or an alkynyl group having from 2 to 4 carbon atoms; $p_{21}$, $p_{22}$ and $p_{23}$ each represent an integer of 0-4, and preferably 0; and $L_{21}$ represents a single bond, an ether group, a carbonyl group or an alkylene group having from 1 to 4 carbon atoms.

$R_3$ is a divalent group having from 6 to 22 carbon atoms containing at least one aromatic ring, and therefore $m_{31}$, $m_{32}$, $R_{21}$ and $p_{21}$ in the formula (R3-1) are selected in such a manner that the divalent group represented by the formula (R3-1) has from 6 to 22 carbon atoms.

Similarly, $L_{21}$, $m_{33}$, $m_{34}$, $R_{22}$, $R_{23}$, $p_{22}$ and $p_{23}$ in the formula (R3-2) are selected in such a manner that the divalent group represented by the formula (R3-2) has from 12 to 22 carbon atoms.

$X_3$ is defined similarly to $X_1$ in the formula (1), and preferred embodiments thereof are also the same.

The polyimide resin (A) may further contain a repeating structural unit represented by the following formula (4):

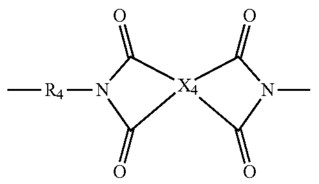

(4)

wherein $R_4$ represents a divalent group containing $—SO_2—$ or $—Si(R_x)(R_y)O—$; $R_x$ and $R_y$ each independently represent a chain aliphatic group having from 1 to 3 carbon atoms, or a phenyl group; and $X_4$ represents a tetravalent group having from 6 to 22 carbon atoms containing at least one aromatic ring.

$X_4$ is defined similarly to $X_1$ in the formula (1), and preferred embodiments thereof are also the same.

The end structure of the polyimide resin (A) is not particularly limited, and preferably has a chain aliphatic group having 5 to 14 carbon atoms at the end thereof.

The chain aliphatic group may be either saturated or unsaturated, and may be in the form of either linear or branched chain. When the polyimide resin (A) contains the above particular group at the end thereof, it is possible to obtain a resin composition excellent in heat aging resistance.

Example of the saturated chain aliphatic group having from 5 to 14 carbon atoms include an n-pentyl group, an n-hexyl group, an n-heptyl group, an n-octyl group, an n-nonyl group, an n-decyl group, an n-undecyl group, a lauryl group, an n-tridecyl group, an n-tetradecyl group, an isopentyl group, a neopentyl group, a 2-methylpentyl group, a 2-methylhexyl group, a 2-ethylpentyl group, a 3-ethylpentyl group, an isooctyl group, a 2-ethylhexyl group, a 3-ethylhexyl group, an isononyl group, a 2-ethyloctyl group, an isodecyl group, an isododecyl group, an isotridecyl group and an isotetradecyl group.

Example of the unsaturated chain aliphatic group having from 5 to 14 carbon atoms include a 1-pentenyl group, a 2-pentenyl group, a 1-hexenyl group, a 2-hexenyl group, a 1-heptenyl group, a 2-heptenyl group, a 1-octenyl group, a 2-octenyl group, a nonenyl group, a decenyl group, a dodecenyl group, a tridecenyl group and a tetradecenyl group.

Among these, the chain aliphatic group is preferably a saturated chain aliphatic group, and more preferably a saturated linear aliphatic group. The chain aliphatic group preferably has 6 or more carbon atoms, more preferably 7 or more carbon atoms and further preferably 8 or more carbon atoms, and preferably has 12 or less carbon atoms, more preferably 10 or less carbon atoms and further preferably 9 or less carbon atoms in consideration of achievement of heat aging resistance. The chain aliphatic group may be adopted singly or in combinations of two or more.

The chain aliphatic group is particularly preferably at least one selected from the group consisting of an n-octyl group, an isooctyl group, a 2-ethylhexyl group, an n-nonyl group, an isononyl group, an n-decyl group and an isodecyl group, further preferably at least one selected from the group consisting of an n-octyl group, an isooctyl group, a 2-ethylhexyl group, an n-nonyl group, and an isononyl group, and most preferably at least one selected from the group consisting of an n-octyl group, an isooctyl group, and a 2-ethylhexyl group.

The polyimide resin (A) preferably contains only a chain aliphatic group having from 5 to 14 carbon atoms, besides a terminal amino group and a terminal carboxy group, at the end thereof in consideration of heat aging resistance. When a group, besides the above groups, is contained at the end, the content thereof with respect to the chain aliphatic group having from 5 to 14 carbon atoms is preferably 10 mol % or less and more preferably 5 mol % or less.

The content of the chain aliphatic group having from 5 to 14 carbon atoms in the polyimide resin (A) is preferably 0.01 mol % or more, more preferably 0.1 mol % or more, and further preferably 0.2 mol % or more based on the total 100 mol % of the total repeating structural units constituting the polyimide resin (A) in consideration of exerting excellent heat aging resistance. In order that a sufficient molecular weight is ensured and good mechanical properties are achieved, the content of the chain aliphatic group having from 5 to 14 carbon atoms in the polyimide resin (A) is preferably 10 mol % or less, more preferably 6 mol % or less and further preferably 3.5 mol % or less based on the total 100 mol % of the total repeating structural units constituting the polyimide resin (A).

The content of the chain aliphatic group having from 5 to 14 carbon atoms in the polyimide resin (A) can be determined by depolymerization of the polyimide resin (A).

The polyimide resin (A) preferably has a melting point of 360° C. or less and a glass transition temperature of 150° C. or more. The melting point of the polyimide resin is more preferably 280° C. or more and further preferably 290° C. or more in consideration of heat resistance, and is preferably 345° C. or less, more preferably 340° C. or less, and further preferably 335° C. or less in consideration of exerting high molding processability. In addition, the glass transition temperature of the polyimide resin (A) is more preferably 160° C. or more and more preferably 170° C. or more in consideration of heat resistance, and is preferably 250° C. or less, more preferably 230° C. or less, and further preferably 200° C. or less in consideration of exerting high molding processability.

Both the melting point and the glass transition temperature of the polyimide resin can be measured by a differential scanning calorimeter.

In addition, in the polyimide resin (A), the exothermic amount (hereinafter, also simply referred to as "exothermic amount of crystallization") of the crystallization exothermic peak observed in melting and then cooling of the polyimide resin at a cooling rate of 20° C./min with differential scanning calorimetric measurement is preferably 5.0 mJ/mg or more, more preferably 10.0 mJ/mg or more, and further preferably 17.0 mJ/mg or more in consideration of enhancement of crystallinity, heat resistance, mechanical strength, and chemical resistance. The upper limit of the exothermic amount of crystallization is not particularly limited, and is usually 45.0 mJ/mg or less.

Specifically, the melting point, the glass transition temperature, and the exothermic amount of crystallization of the polyimide resin can be measured by the methods described in Examples.

The logarithmic viscosity of the polyimide resin (A) at 30° C. in a 5 mass % concentrated sulfuric acid solution is preferably 0.2 to 2.0 dL/g and more preferably 0.3 to 1.8 dL/g. When the logarithmic viscosity is 0.2 dL/g or more, a molded article formed of the polyimide resin composition obtained has sufficient mechanical strength, and when the logarithmic viscosity is 2.0 dL/g or less, molding processability and handleability are good. The logarithmic viscosity μ is obtained according to the following expression by measuring the elapsed times for flowing concentrated sulfuric acid and the polyimide resin solution at 30° C. with a Cannon-Fenske viscometer.

$$\mu=\ln(ts/t_0)/C$$

$t_0$: elapsed time for flowing concentrated sulfuric acid ts: elapsed time for flowing polyimide resin solution C: 0.5 (g/dL)

The weight average molecular weight Mw of the polyimide resin (A) is preferably in the range of 10,000 to 150,000, more preferably 15,000 to 100,000, further preferably 20,000 to 80,000, still further preferably 30,000 to 70,000, and still further preferably 35,000 to 65,000. When the weight average molecular weight Mw of the polyimide resin (A) is 10,000 or more, the mechanical strength of a molded article obtained is good, when the Mw is 40,000 or more, the mechanical strength stability is good, and when the Mw is 150,000 or less, the molding processability is good.

The weight average molecular weight of the polyimide resin (A) can be measured by a gel permeation chromatography (GPC) method using polymethyl methacrylate (PMMA) as a standard sample.

(Method for Producing Polyimide Resin (A))

The polyimide resin (A) may be produced by reacting a tetracarboxylic acid component and a diamine component. The tetracarboxylic acid component contains a tetracarboxylic acid containing at least one aromatic ring and/or a derivative thereof, and the diamine component contains a diamine containing at least one alicyclic hydrocarbon structure and a chain aliphatic diamine.

The tetracarboxylic acid containing at least one aromatic ring is preferably a compound having four carboxy groups that are bonded directly to the aromatic ring, and may contain an alkyl group in the structure thereof. The tetracarboxylic acid preferably has from 6 to 26 carbon atoms. Preferred examples of the tetracarboxylic acid include pyromellitic acid, 2,3,5,6-toluenetetracarboxylic acid, 3,3',4,4'-benzophenonetetracarboxylic acid, 3,3',4,4'-biphenyltetracarboxylic acid and 1,4,5,8-naphthalenetetracarboxylic acid. Among these, pyromellitic acid is more preferred.

Examples of the derivative of the tetracarboxylic acid containing at least one aromatic ring include an anhydride and an alkyl ester compound of a tetracarboxylic acid containing at least one aromatic ring. The derivative of the tetracarboxylic acid preferably has from 6 to 38 carbon atoms. Examples of the anhydride of the tetracarboxylic acid include pyromellitic monoanhydride, pyromellitic dianhydride, 2,3,5,6-toluenetetracarboxylic dianhydride, 3,3',4,4'-diphenylsulfonetetracarboxylic dianhydride, 3,3',4,4'-benzophenonetetracarboxylic dianhydride, 3,3',4,4'-biphenyltetracarboxylic dianhydride and 1,4,5,8-naphthalenetetracarboxylic dianhydride. Examples of the alkyl ester compound of the tetracarboxylic acid include dimethyl pyromellitate, diethyl pyromellitate, dipropyl pyromellitate, diisopropyl pyromellitate, dimethyl 2,3,5,6-toluenetetracarboxylate, dimethyl 3,3',4,4'-diphenylsulfonetetracarboxylate, dimethyl 3,3',4,4'-benzophenonetetracarboxylate, dimethyl 3,3',4,4'-biphenyltetracarboxylate and dimethyl 1,4,5,8-naphthalenetetracarboxylate. The alkyl group in the alkyl ester compound of the tetracarboxylic acid preferably has from 1 to 3 carbon atoms.

The tetracarboxylic acid containing at least one aromatic ring and/or the derivative thereof may be used as a sole compound selected from the aforementioned compounds or may be used as a combination of two or more compounds.

The diamine containing at least one alicyclic hydrocarbon structure preferably has from 6 to 22 carbon atoms, and preferred examples thereof include 1,2-bis(aminomethyl)cyclohexane, 1,3-bis(aminomethyl)cyclohexane, 1,4-bis(aminomethyl)cyclohexane, 1,2-cyclohexanediamine, 1,3-cyclohexanediamine, 1,4-cyclohexanediamine, 4,4'-diaminodicyclohexylmethane, 4,4'-methylenebis(2-methylcyclohexylamine), carvone diamine, limonene diamine, isophorone diamine, norbornane diamine, bis(aminomethyl)tricyclo[5.2.1.0$^{2,6}$]decane, 3,3'-dimethyl-4,4'-diaminodicyclohexylmethane and 4,4'-diaminodicyclohexylpropane. These compounds may be used solely or may be used as a combination of two or more compounds selected therefrom. Among these, 1,3-bis(aminomethyl)cyclohexane is preferably used. A diamine containing an alicyclic hydrocarbon structure generally has conformational isomers, and the ratio of the cis isomer and the trans isomer is not particularly limited.

The chain aliphatic diamine may be in the form of either linear or branched chain, and has preferably from 5 to 16 carbon atoms, more preferably from 6 to 14 carbon atoms and further preferably from 7 to 12 carbon atoms. The linear moiety having from 5 to 16 carbon atoms may contain an ether bond in the course thereof. Preferred examples of the chain aliphatic diamine include 1,5-pentamethylenethamine, 2-methylpentane-1,5-diamine, 3-methylpentane-1,5-diamine, 1,6-hexamethylenediamine, 1,7-heptamethylenediamine, 1,8-octamethylenediamine, 1,9-nonamethylenediamine, 1,10-decamethylenediamine, 1,11-undecamethylenediamine, 1,12-dodecamethylenediamine, 1,13-tridecamethylenediamine, 1,14-tetradecamethylenediamine, 1,16-hexadecamethylenediamine, and 2,2'-(ethylenedioxy)bis(ethyleneamine).

The chain aliphatic diamine may be used as a sole compound or as a mixture of plural kinds thereof. Among these, a chain aliphatic diamine having from 8 to 10 carbon atoms can be preferably used, and at least one selected from the group consisting of 1,8-octamethylenediamine and 1,10-decamethylenediamine can be particularly preferably used.

In the production of the polyimide resin (A), the molar ratio of the charged amount of the diamine containing at least one alicyclic hydrocarbon structure with respect to the total amount of the diamine containing at least one alicyclic hydrocarbon structure and the chain aliphatic diamine is preferably 20 to 70 mol %. The molar ratio is preferably 25 mol % or more, more preferably 30 mol % or more, further preferably 32 mol % or more, and is preferably 60 mol % or less, more preferably 50 mol % or less, further preferably less than 40 mol, and further preferably 35 mol % or less in consideration of exerting high crystallinity.

The diamine component may contain a diamine containing at least one aromatic ring. The diamine containing at least one aromatic ring preferably has from 6 to 22 carbon atoms, and examples thereof include o-xylylenediamine, m-xylylenediamine, p-xylylenediamine, 1,2-diethynylbenzenediamine, diethynylbenzenediamine, 1,4-diethynylbenzenediamine, 1,2-diaminobenzene, 1,3-diaminobenzene, 1,4-diaminobenzene, 4,4'-diaminodiphenyl ether, 3,4'-diaminodiphenyl ether, 4,4'-diaminodiphenylmethane, α,α'-bis(4-aminophenyl)-1,4-diisopropylbenzene, α,α'-bis(3-aminophenyl)-1,4-diisopropylbenzene, 2,2-bis(4-(4-aminophenoxy)phenyl)propane, 2,6-diaminonaphthalene and 1,5-diaminonaphthalene.

The molar ratio of the charged amount of the diamine containing at least one aromatic ring with respect to the total amount of the diamine containing at least one alicyclic hydrocarbon structure and the chain aliphatic diamine is preferably 25 mol % or less. The lower limit thereof is not particularly limited but needs to exceed 0 mol %.

The molar ratio is preferably 5 mol % or more, and more preferably 10 mol % or more, in consideration of enhancement of the heat resistance, and is preferably 20 mol % or less, and more preferably 15 mol % or less, in consideration of maintenance of the crystallinity.

In addition, the molar ratio is preferably 12 mol % or less, more preferably 10 mol % or less, further preferably 5 mol % or less and still more preferably 0 mol % in consideration of a decrease in coloration of the polyimide resin.

In the production of the polyimide resin (A), the charged amount ratio of the tetracarboxylic acid component and the diamine component is preferably from 0.9 to 1.1 mol of the diamine component per 1 mol of the tetracarboxylic acid component.

In the production of the polyimide resin (A), an end capping agent may be mixed in addition to the tetracarboxylic acid component and the diamine component. The end capping agent is preferably at least one selected from the group consisting of a monoamine compound and a dicarboxylic acid compound. The amount of the end capping agent to be used may be any amount as long as a desired amount of an end group can be introduced into the polyimide resin (A), and the amount is preferably 0.0001 to 0.1 mol, more preferably 0.001 to 0.06 mol, and further preferably 0.002 to 0.035 mol, per 1 mol of the tetracarboxylic acid and/or the derivative thereof.

Examples of the monoamine end capping agent include methylamine, ethylamine, propylamine, butylamine, n-pentylamine, n-hexylamine, n-heptylamine, n-octylamine, n-nonylamine, n-decylamine, n-undecylamine, laurylamine, n-tridecylamine, n-tetradecylamine, isopentylamine, neopentylamine, 2-methylpentylamine, 2-methylhexylamine, 2-ethylpentylamine, 3-ethylpentylamine, isooctylamine, 2-ethylhexylamine, 3-ethylhexylamine, isononylamine, 2-ethyloctylamine, isodecylamine, isododecylamine, isotridecylamine, isotetradecylamine, benzylamine, 4-methylbenzylamine, 4-ethylbenzylamine, 4-dodecylbenzylamine, 3-methylbenzylamine, 3-ethylbenzylamine, aniline, 3-methylaniline and 4-methylaniline.

The dicarboxylic acid end capping agent is preferably a dicarboxylic acid compound, which may partially have a closed ring structure. Examples thereof include phthalic acid, phthalic anhydride, 4-chlorophthalic acid, tetrafluorophthalic acid, 2,3-benzophenonedicarboxylic acid, 3,4-benzophenonedicarboxylic acid, cyclohexane-1,2-dicarboxylic acid, cyclopentane-1,2-dicarboxylic acid and 4-cyclohexene-1,2-dicarboxylic acid. Among these, phthalic acid and phthalic anhydride are preferred.

Such an end capping agent may be used singly or in combinations of two or more.

Among these, the monoamine end capping agent is preferable, and a monoamine containing a chain aliphatic group having from 5 to 14 carbon atoms is more preferable and a monoamine containing a saturated linear aliphatic group having from 5 to 14 carbon atoms is further preferable in consideration of introduction of the chain aliphatic group having from 5 to 14 carbon atoms into the end of the polyimide resin (A) for enhancement of heat aging resistance. The chain aliphatic group preferably has 6 or more carbon atoms, more preferably has 7 or more carbon atoms and further preferably has 8 or more carbon atoms, and preferably has 12 or less carbon atoms, more preferably has 10 or less carbon atoms and further preferably has 9 or less carbon atoms. A monoamine containing a chain aliphatic group having 5 or more carbon atoms is preferable because of being hardly volatilized in production of the polyimide resin (A).

The end capping agent is particularly preferably at least one selected from the group consisting of n-octylamine, isooctylamine, 2-ethylhexylamine, n-nonylamine, isononylamine, n-decylamine, and isodecylamine, further preferably at least one selected from the group consisting of n-octylamine, isooctylamine, 2-ethylhexylamine, n-nonylamine, and isononylamine, and most preferably at least one selected from the group consisting of n-octylamine, isooctylamine, and 2-ethylhexylamine.

As a polymerization method for producing the polyimide resin (A), a known polymerization method may be applied, and examples thereof include, for example, solution polymerization, melt polymerization, solid phase polymerization, suspension polymerization and the like while not particularly limited. Among these, suspension polymerization under a high temperature condition using an organic solvent is preferred. On performing suspension polymerization under a high temperature condition, the polymerization is preferably performed at 150° C. or more, and more preferably at from 180 to 250° C. The polymerization time may vary depending on the monomers used, and is preferably approximately from 0.1 to 6 hours.

The method for producing the polyimide resin (A) preferably includes the step of reacting the tetracarboxylic acid component with the diamine component in the presence of a solvent containing an alkylene glycol-based solvent represented by the following formula (I). In this way, the polyimide resin excellent in handleability may be obtained in a powder form:

$$Ra_1—O—(Ra_2—O)_n—H \qquad (I)$$

wherein $Ra_1$ represents a hydrogen atom or an alkyl group having from 1 to 4 carbon atoms; $Ra_2$ represents a linear alkylene group having from 2 to 6 carbon atoms; and n represents an integer of 1-3.

In order to obtain a homogeneous powder polyimide resin, it is considered to be desirable that the solvent in a one-pot reaction possess two properties of (1) homogeneously dissolving a polyamic acid or homogeneously dispersing a nylon salt, and (2) not dissolving and swelling the polyimide resin at all. A solvent comprising the alkylene glycol-based solvent represented by the formula (I) generally satisfies the two properties.

The alkylene glycol-based solvent has a boiling point of preferably 140° C. or more, more preferably 160° C. or more, and further preferably 180° C. or more, in consideration of feasible polymerization reaction under high temperature conditions at normal pressure.

In the formula (I), $Ra_1$ represents a hydrogen atom or an alkyl group having from 1 to 4 carbon atoms and is preferably an alkyl group having from 1 to 4 carbon atoms, and more preferably a methyl group or an ethyl group.

In the formula (I), $Ra_2$ represents a linear alkylene group having from 2 to 6 carbon atoms and is preferably a linear alkylene group having 2 or 3 carbon atoms, and more preferably an ethylene group.

In the formula (I), n represents an integer of 1-3 and is preferably 2 or 3. Specific examples of the alkylene glycol-based solvent include ethylene glycol monomethyl ether, diethylene glycol monomethyl ether (also known as 2-(2-methoxyethoxy)ethanol), triethylene glycol monomethyl ether, ethylene glycol monoethyl ether, diethylene glycol monoethyl ether (also known as 2-(2-ethoxyethoxy)ethanol), ethylene glycol monoisopropyl ether, diethylene glycol monoisopropyl ether, triethylene glycol monoisopropyl ether, ethylene glycol monobutyl ether, diethylene glycol monobutyl ether, triethylene glycol monobutyl ether, ethylene glycol monoisobutyl ether, diethylene glycol monoisobutyl ether, ethylene glycol monoisobutyl ether, ethylene glycol, and 1,3-propanediol. These solvents may each be used alone, or two or more solvents selected from them may be used in combination. Among these solvents, 2-(2-methoxyethoxy)ethanol, triethylene glycol monomethyl ether, 2-(2-ethoxyethoxy)ethanol, and 1,3-propanediol are preferred, and 2-(2-methoxyethoxy)ethanol and 2-(2-ethoxyethoxy)ethanol are more preferred.

The content of the alkylene glycol-based solvent in the solvent is preferably 30 mass % or more, more preferably 50 mass % or more, further preferably 75 mass % or more, and further preferably 90 mass % or more. The solvent may consist of the alkylene glycol-based solvent alone.

When the solvent contains the alkylene glycol-based solvent and an additional solvent, specific examples of the "additional solvent" include water, benzene, toluene, xylene, acetone, hexane, heptane, chlorobenzene, methanol, ethanol, n-propanol, isopropanol, butanol, pentanol, hexanol, heptanol, octanol, N-methyl-2-pyrrolidone, N,N-dimethylacetamide, N,N-diethylacetamide, N,N-dimethylformamide, N,N-diethylformamide, N-methylcaprolactam, hexamethylphosphoramide, tetramethylene sulfone, dimethylsulfoxide, o-cresol, m-cresol, p-cresol, phenol, p-chlorophenol, 2-chloro-4-hydroxytoluene, triglyme, tetraglyme, dioxane, γ-butyrolactone, dioxolane, cyclohexanone, cyclopentanone, dichloromethane, chloroform, 1,2-dichloroethane, 1,1,2-trichloroethane, dibromomethane, tribromomethane, 1,2-dibromoethane, and 1,1,2-tribromoethane. These solvents may each be used alone, or two or more solvents selected from them may be used in combination.

Preferred examples of the method for producing the polyimide resin (A) include a method which involves separately preparing (a) a solution containing the tetracarboxylic acid component in a solvent containing the alkylene glycol-based solvent and (b) a solution containing the diamine component in a solvent containing the alkylene glycol-based solvent, then adding the solution (b) to the solution (a) or adding the solution (a) to the solution (b), thereby preparing (c) a solution containing a polyamic acid, and subsequently imidizing the polyamic acid as well as depositing a polyimide resin powder in the solution (c) by the heating of the solution (c), thereby synthesizing a polyimide resin (A).

While the reaction of the tetracarboxylic acid component with the diamine component can be performed either under normal pressure or under pressure, the reaction is preferably performed under normal pressure because no pressure resistant container is required under normal pressure.

When the end capping agent is used, it is preferable to mix the solution (a) and the solution (b), mix the end capping agent with the mixed solution to prepare the solution (c) containing a polyamic acid, and subsequently heat the solution (c), and it is more preferable to add the end capping agent after completion of addition of the solution (b) to the solution (a), to prepare the solution (c) containing a polyamic acid, and subsequently heat the solution (c).

In the method for producing the polyimide resin (A), preferably, the tetracarboxylic acid component contains a tetracarboxylic dianhydride; the step of reacting the tetracarboxylic acid component with the diamine component includes: step (i) of adding (b) a solution containing the diamine component and the alkylene glycol-based solvent to (a) a solution containing the tetracarboxylic acid component and the alkylene glycol-based solvent, thereby preparing (c) a solution containing a polyamic acid; and step (ii) of imidizing the polyamic acid as well as depositing a polyimide resin powder in the solution (c) by the heating of the solution (c), thereby providing a polyimide resin powder; and in the step (i), the solution (b) is added to the solution (a) such that the amount of the diamine component added per unit time with respect to 1 mol of the tetracarboxylic acid component is 0.1 mol/min or less, in consideration of reduction in the amount of by-products in the polyimide resin (A).

<Glass Fiber (B)>

In the polyimide resin composition of the present invention, the polyimide resin (A) and glass fiber (B) are mixed. Mixing the glass fiber (B) in the polyimide resin (A) having thermoplastic and crystallinity can provide a polyimide resin composition having significantly improved heat resistance and mechanical strength, being excellent in molding processability as well as having a good balance between heat resistance and mechanical strength. Further, mixing the glass fiber (B) makes the slidability better.

The glass composition constituting the glass fiber (B) is not particularly limited, and appropriately selected depending on the intended application and required performance.

The average fiber diameter of the glass fiber (B) is preferably 1 to 100 μm, more preferably 3 to 50 μm, and further preferably 4 to 20 μm. When the average fiber diameter is in the above range, the polyimide resin composition is easily molding-processed and additionally excellent in mechanical strength. The average fiber diameter of the glass fiber (B) can be determined as follows: the fiber (B) are observed under a scanning electron microscope (SEM), 50 fibers are selected at random, their lengths are measured, and a number-average fiber diameter is calculated.

The shape of the glass fiber (B) is not particularly limited as long as the fiber (B) is in a fibrous form, and the glass fiber (B) is preferably used in the form of a chopped strand in consideration of handleability and the molding processability and mechanical strength of a polyimide resin composition obtained.

The average fiber length (cut length) of the glass fiber (B) as a raw material before mixed in the polyimide resin composition is preferably 0.5 to 15 mm, more preferably 1 to 10 mm, and further preferably 1 to 6 mm in consideration of handleability and ease of molding processing.

The average fiber length of the glass fiber (B) present in the polyimide resin composition is preferably 0.3 to 10 mm, more preferably 0.5 to 6 mm, and further preferably 0.8 to 5 mm in consideration of the molding processability and mechanical strength of the polyimide resin composition.

In a method for measuring the average fiber length of the glass fiber (B) present in the polyimide resin composition, the average fiber length may be determined, for example, by placing the polyimide resin composition or a molded article thereof in hexafluoroisopropanol (HFIP) or concentrated sulfuric acid and measuring the length of fiber remaining after the dissolution of the polyimide resin (A). The length of the fiber may be measured by visual observation or in some cases, observation under an optical microscope, a scanning electron microscope (SEM) or the like. 100 fibers are selected at random, and their lengths are measured. A number-average fiber length may be calculated.

The cross-sectional shape of the glass fiber (B) is not particularly limited, and the fiber (B) may have either of an identical cross-sectional shape or irregular cross-sectional shape. In consideration of the mechanical strength of a polyimide resin composition obtained, an irregular cross-sectional shape may also be selected. Here, the cross section of the glass fiber means a transverse section perpendicular to the fiber length direction of the glass fiber.

Example of the irregular cross-sectional shape include a flat shape (oblong shape), a cocoon-like shape, an elliptical shape, a semicircular shape, an arc shape, a rectangular shape, or a shape similar thereto. Among these, the irregular cross-sectional shape is preferably a flat (oblong) cross-sectional shape in consideration of enhancement of mechanical strength.

When the cross section of the glass fiber (B) is an irregular cross-sectional shape, the ratio of the major axis (the longest linear distance across the section) to the minor axis (the longest linear distance perpendicular to the major axis) (irregular shape ratio) is preferably 1.3 to 10, more preferably 1.5 to 8, and further preferably 1.7 to 6.

The cross-sectional shape of the glass fiber (B) as a raw material before mixed in the polyimide resin composition is determined as an identical cross-sectional shape or irregular cross-sectional shape by observation under an optical microscope, a scanning electron microscope (SEM) or the like. When the shape is an irregular cross-sectional shape, it is possible to further determine the specific type of the shape. 100 fibers are selected at random, the major axis and minor axis of the cross section of the fibers are measured, and the irregular shape ratio can be calculated as a number-average irregular shape ratio.

Meanwhile, in the case of the glass fiber (B) present in the polyimide resin composition, for example, the polyimide resin composition or molded article thereof is placed in hexafluoroisopropanol (HFIP) or concentrated sulfuric acid to dissolve the polyimide resin (A). Thereafter, the remaining fiber can be subjected to determination of the cross-sectional shape and the measurement of the irregular shape ratio in the same manner as for the glass fiber (B) as the raw material before mixed in the polyimide resin composition.

The glass fiber (B) is preferably surface-treated with a sizing agent in order to enhance interface adherence with the polyimide resin (A) and to enhance the mechanical strength of a polyimide resin composition obtained.

Examples of the sizing agent include a urethane-based sizing agent, an epoxy-based sizing agent, an acryl-based sizing agent, a polyester-based sizing agent, a vinyl ester-based sizing agent, a polyolefin-based sizing agent, a polyether-based sizing agent, and a carboxylic acid-based sizing agent.

The above sizing agents can each be used alone or can be used in combinations of two or more thereof. Examples of a sizing agent obtained by combining two or more include a urethane/epoxy-based sizing agent, a urethane/acryl-based sizing agent, and a urethane/carboxylic acid-based sizing agent.

Examples of the urethane-based sizing agent include a urethane resin obtained by a reaction between a polyol and a polyisocyanate.

Examples of the polyol include polyester polyols such as polyethylene adipate diol, polybutylene adipate diol, polyethylenebutylene adipate diol, polyneopentyl adipate diol, polyneopentyl terephthalate diol, polycaprolactone polyvalerolactone diol, and polyhexamethylene carbonate diol; and polyether polyols such as polyethylene glycol, polypropylene glycol, polyoxyethylene oxypropylene glycol, polyoxytetramethylene glycol, and ethylene oxide and/or propylene oxide adducts of bisphenols.

Examples of the polyisocyanates include aromatic polyisocyanates such as 2,4'-diphenylmethane diisocyanate or 4,4'-diphenylmethane diisocyanate (MDI), 2,4-tolylene diisocyanate or 2,6-tolylene diisocyanate (TDI), diisocyanate, 1,3-phenylene diisocyanate or 1,4-phenylene diisocyanate, 1,5-naphthalene diisocyanate, and xylylene diisocyanate; aliphatic polyisocyanates such as ethylene diisocyanate, hexamethylene diisocyanate (HDI), and lysine diisocyanate; and alicyclic polyisocyanates such as isophorone diisocyanate (IPDI) and 4,4'-dicyclohexylmethane diisocyanate (H12MDI).

The above polyols and polyisocyanates can each be used alone or in combination of two or more thereof.

Examples of the epoxy-based sizing agent include epoxy resins having two or more epoxy groups in one molecule. Specific examples thereof include a bisphenol A novolak-type epoxy resin, a bisphenol F novolak-type epoxy resin, a biphenyl-type bifunctional epoxy resin, a biphenyl-modified novolak-type epoxy resin, a bisphenol A-type epoxy resin, a bisphenol F-type epoxy resin, a naphthol-cresol co-condensation novolak-type epoxy resin, a naphthol-phenol co-condensation novolak-type epoxy resin, a dicyclopentadiene-phenol addition reaction-type epoxy resin, a triphenylmethane-type epoxy resin, a phenol novolak-type epoxy resin, a cresol novolak-type epoxy resin, a tetraphenylethane-type epoxy resin, and a naphthol novolak-type epoxy resin. Among these, as the epoxy resin, an epoxy resin having a bisphenol structure such as bisphenol A or bisphenol F is preferable. The epoxy equivalent of the epoxy resin is preferably 180 g/equivalent or more and more preferably 200 to 1900 g/equivalent in consideration of the sizing property of the glass fiber (B).

Examples of the acryl-based sizing agent include acryl resins, and specific examples thereof include homopolymers of an acryl-based monomer such as (meth)acrylic acid and (meth)acrylate or copolymers of such monomers, and copolymers of the above acryl-based monomer and another monomer capable of copolymerizing with the acryl monomer.

Examples of the polyester-based sizing agent include polyester resins obtained by a polycondensation reaction between a polyol such as an aliphatic diol, an aromatic diol, or a trihydric or higher polyhydric alcohol and a polycarboxylic acid such as an aliphatic dicarboxylic acid, an aromatic dicarboxylic acid, or a trivalent or higher polyvalent carboxylic acid.

Examples of the vinyl ester-based sizing agent include vinyl acetate resins, and specific examples thereof include homopolymers of vinyl acetate, or copolymers of vinyl acetate and another monomer capable of copolymerizing with vinyl acetate.

Examples of the polyolefin-based sizing agent include polyolefin resins such as an ultra-high molecular weight polyethylene resin, a high density polyethylene resin, a low density polyethylene resin, an ultra-low density polyethylene resin, a polypropylene resin, a polystyrene resin, and a polyethylene copolymer. Examples of the polyethylene copolymer include copolymers of ethylene and another monomer capable of copolymerizing with ethylene such as an α-olefin, for example, propylene, butene-1, isoprene, and butadiene.

It is also possible to use an acid-modified polyolefin resin obtained by modifying the above polyolefin resin with an acidic compound such as an unsaturated carboxylic acid or a carboxylic anhydride.

Examples of the polyether-based sizing agent include polyether resins having a polyoxyalkylene structure such as polyalkylene glycol and bisphenol A-alkylene oxide adducts.

Examples of the carboxylic acid-based sizing agent include copolymers of an unsaturated vinyl monomer containing a carboxylic anhydride such as maleic anhydride, itaconic anhydride, and citraconic anhydride and another unsaturated vinyl monomer such as styrene, α-methylstyrene, ethylene, and butadiene.

Among the above sizing agents, one or more selected from the group consisting of a urethane-based sizing agent and a urethane/epoxy-based sizing agent are preferable in consideration that the interface adherence with the polyimide resin (A) is good and the mechanical strength of the polyimide resin composition can be further enhanced, and a urethane-based sizing agent is preferable in consideration that mechanical strength and a good color tone are obtained.

The amount of the sizing agent to be used in the glass fiber (B) is not particularly limited, and is usually in the range of 0.005 to 5 mass % and preferably in the range of 0.01 to 2 mass % with respect to the glass fiber (B).

The glass fiber (B) may be further surface-treated with a surface treatment agent other than the above sizing agent in consideration of enhancement of adherence between the glass component constituting the glass fiber (B) and the sizing agent and enhancement of the interface adherence between the polyimide resin (A) and the glass fiber (B). Examples of the surface treatment agent include silane-based compounds such as a silane coupling agent, titanium-based compounds such as a titanate coupling agent, and chromium-based compounds. Among these, silane-based compounds such as silane coupling agents are preferable.

Examples of the silane coupling agent include a silane coupling agent having an alkyl group, a silane coupling agent having an aryl group, a silane coupling agent having a vinyl group, a silane coupling agent having an amino group, a silane coupling agent having an epoxy group, a silane coupling agent having a (meth)acryl group, and a silane coupling agent having a mercapto group.

Among these, a silane coupling agent having an amino group is preferable in consideration of enhancement of adherence between the polyimide resin (A) and the glass fiber (B). Specific examples of the silane coupling agent having an amino group include 3-aminopropyltrimethoxysilane, 3-aminopropylmethyldimethoxysilane, 3-aminopropyltriethoxysilane, 3-aminopropylmethyldiethoxysilane, N-(β-aminoethyl)-γ-aminopropyltrimethoxysilane, N-(β-aminoethyl)-γ-aminopropylmethyldimethoxysilane, N-(β-aminoethyl)-γ-aminopropyltriethoxysilane, N-(β-aminoethyl)-γ-aminopropylmethyldiethoxysilane, N-phenyl-3-aminopropyltrimethoxysilane, and N-phenyl-3-aminopropylmethyldimethoxysilane. These can each be used alone or can be used in combinations of two or more thereof.

The amount of the surface treatment agent other than the above sizing agent to be used in the glass fiber (B) is not particularly limited, and usually in the range of 0.005 to 5 mass % and preferably in the range of 0.01 to 2 mass % with respect to the glass fiber (B).

The glass fiber (B) may be produced by a known method. Alternatively, commercially available glass fiber may be used as the glass fiber (B). Examples of commercially available glass fiber include "ECS 03 T-786H", "ECS 03 T-781DE", and "ECS 03 T-747H" produced by Nippon Electric Glass Co., Ltd.

The amount of the glass fiber (B) mixed in the polyimide resin composition is preferably 15 to 80 mass % and more preferably 20 to 70 mass %. When the amount of the glass fiber (B) mixed is 15 mass % or more, a sufficient effect of improving physical properties can be obtained, and when the amount is 80 mass % or less, good molding processability can be maintained.

Among these, the amount of the glass fiber (B) mixed in the polyimide resin composition is further preferably 20 to 65 mass %, still further preferably 20 to 60 mass %, and still further preferably 30 to 60 mass % in consideration that both the heat resistance and mechanical strength of polyimide resin composition are enhanced by the effect of improving physical properties of the glass fiber (B).

<Inorganic Filler Other than Glass Fiber (B)>

An inorganic filler other than the glass fiber (B) (hereinafter, simply also referred to as "inorganic filler") may be further added to the polyimide resin composition. When the inorganic filler is mixed, the heat resistance and mechanical strength of the polyimide resin composition further can be enhanced. It is considered that this is because the inorganic filler serves as a crystal nucleating agent in the polyimide resin composition.

The shape of the inorganic filler is not particularly limited, and may be any of particulate, plate-like and fibrous. A particulate or plate-like inorganic filler is preferable in consideration that the filler is caused to serve as a crystal nucleating agent in the polyimide resin composition to thereby enhance heat resistance and mechanical strength.

In the case of a particulate or plate-like inorganic filler, the average particle size thereof is preferably 0.01 to 50 μm, more preferably 0.1 to 20 μm, further preferably 0.2 to 10 μm, and still further preferably 0.2 to 3 μm. When the average particle size of the inorganic filler is within the above range, the filler is more likely to exert an effect as a crystal nucleating agent in the polyimide resin composition. The average particle size can be measured with a laser diffraction-type particle size analyzer, for example.

Examples of the particulate or plate-like inorganic filler include silica, alumina, kaolinite, wollastonite, mica, talc, clay, sericite, magnesium carbonate, magnesium sulfate, calcium oxide, titanium oxide, silicon carbide, antimony trisulfide, tin sulfide, copper sulfide, iron sulfide, bismuth sulfide, zinc sulfide, a metal powder, a glass powder, a glass flake, and glass beads.

Examples of the fibrous inorganic filler other than the glass fiber (B) include carbon fiber, metal fiber, graphite fiber, silica fiber, silica-alumina fiber, alumina fiber, zirconia fiber, boron nitride fiber, silicon nitride fiber, boron fiber, potassium titanate whisker, aluminum borate whisker, magnesium-based whisker, and silicon-based whisker. Examples of the carbon fiber include polyacrylonitrile-based carbon fiber and pitch-based carbon fiber. These inorganic fillers can each be used alone or can be used in combinations of two or more thereof.

Among these, talc is preferably mixed as the inorganic filler other than the glass fiber (B) in consideration of enhancement in the heat resistance and mechanical strength of the polyimide resin composition.

When the inorganic filler other than the glass fiber (B) is used, the amount of the inorganic filler mixed in the polyimide resin composition is preferably 0.05 to 15 mass %, more preferably 0.1 to 10 mass %, and further preferably 0.2 to 5 mass %. When the amount of the inorganic filler mixed is within the above range, it is possible to further enhance heat resistance and mechanical strength without impairing the characteristics derived from the polyimide resin (A) and the effect of improving physical properties of the glass fiber (B).

The total amount of the glass fiber (B) and the inorganic filler mixed in the polyimide resin composition is preferably 15 to 85 mass %, more preferably 20 to 80 mass %, further preferably 20 to 70 mass %, still further preferably 30 to 65 mass %, and still further preferably 30 to 60 mass % in consideration that the effect of improving physical properties and good molding processability are both achieved.

The polyimide resin (A) is used as the thermoplastic resin component in the polyimide resin composition of the present invention. Thus, even if, for example, 70 mass % or more of the glass fiber (B) or an inorganic filler is mixed in the resin composition, it is possible to maintain good molding processability without impairing flowability on molding such as injection molding.

The amount of the glass fiber (B) and the inorganic filler mixed (mass %) in the polyimide resin composition can be determined by, for example, firing about 5 g of the polyimide resin composition in a muffle furnace at 625° C. for three hours and measuring the proportion of the mass of the residue after the firing with respect to the total mass of the polyimide resin composition before the firing.

<Additive>

In the polyimide resin composition of the present invention, additives may be mixed as required, such as a delusterant, a nucleating agent, a plasticizer, an antistatic agent, an anti-coloring agent, an anti-gelling agent, a flame retardant, a colorant, a slidability-improving agent, an antioxidant, a conducting agent, and a resin-modifying agent.

The amount of the above additive mixed is not particularly limited, and usually 50 mass % or less, preferably 0.0001 to 30 mass %, more preferably 0.0001 to 15 mass %, further preferably 0.001 to 10 mass %, and further preferably 0.01 to 8 mass % in the polyimide resin composition in consideration that the physical properties derived from the polyimide resin (A) are maintained and the effect of the additive is exerted.

Another resin other than the polyimide resin (A) may also be mixed in the polyimide resin composition of the present invention, without impairing the characteristics of the composition. Such another resin is preferably a high heat resistant thermoplastic resin, and examples thereof include a polyamide resin, a polyester resin, a polyimide resin other than the polyimide resin (A), a polycarbonate resin, a polyetherimide resin, a polyamideimide resin, a polyphenylene ether imide resin, a polyphenylene sulfide resin, a polsulfone resin, a polyethersulfone resin, a polyallylate resin, a liquid crystal polymer, a polyether ether ketone resin, a polyether ketone resin, a polyether ketone ketone resin, a polyether ether ketone ketone resin, and a polybenzoimidazole resin. Among these, one or more selected from the group consisting of a polyether imide resin, a polyphenylene sulfide resin, and a polyether ether ketone resin are preferable in consideration of heat resistance, molding processability, strength and solvent resistance.

When the polyimide resin (A) is used in combination with another resin, the rate of such another resin to be mixed is not particularly limited, without impairing the characteristics of the polyimide resin composition.

However, the total content of the polyimide resin (A) and the glass fiber (B) in the polyimide resin composition of the present invention is preferably 50 mass % or more, more preferably 70 mass % or more, further preferably 80 mass % or more, and still further preferably 90 mass % or more in consideration of achievement of the effect of the present invention. The upper limit thereof is 100 mass %.

The specific gravity of the polyimide resin composition or molded article of the present invention is usually 1.1 to 2.5 g/cm$^3$ and preferably 1.2 to 2.0 g/cm$^3$ although the preferable range depends on the application.

[Molded Article]

The present invention provides a molded article including the polyimide resin composition.

Since the polyimide resin composition of the present invention has thermoplasticity, the molded article can be easily produced by heat-molding the polyimide resin composition. Examples of the heat molding method include injection molding, extrusion molding, blow molding, heat press molding, vacuum molding, pneumatic molding, laser molding, welding, and heat adhesion, and the polyimide resin composition of the present invention may be molded by any molding method that includes a heat melting step. Heat molding is preferable because molding is enable without setting the molding temperature to an elevated temperature more than 400° C., for example. Among these, injection molding is preferably performed because such molding can be performed without the molding temperature and the mold temperature in molding being set at high temperatures. For example, injection molding can be performed at a molding temperature of preferably 400° C. or less and more preferably 360° C. or less and a mold temperature of preferably 260° C. or less and more preferably 220° C. or less.

The method for producing a molded article preferably includes the step of heat-molding the polyimide resin composition at from 290 to 350° C. Although heat molding can be performed at a temperature more than 350° C. to 390° C., heat molding is preferably performed at a temperature of 350° C. or less in consideration of suppression of deterioration in the polyimide resin (A), another resin component, and various fillers.

Examples of specific procedures include the following method.

First, various arbitrary components are, if necessary, added to the polyimide resin (A) and dry blended, and thereafter the resulting mixture is introduced into an extruder and melted preferably at from 290 to 350° C. Then, the glass fiber (B) is introduced thereto with a side feeder, melt-kneaded in the extruder, and extruded, thereby producing pellets. Alternatively, the polyimide resin (A) may be introduced into an extruder and molten preferably at from 290 to 350° C., and glass fiber (B) and various arbitrary components, if necessary, may be introduced thereto with the side feeder, melt-kneaded with the polyimide resin (A) in the extruder, and extruded, thereby producing the pellets.

The pellets may be dried, then introduced in various kinds of molding machines, and heat-molded preferably at from 290 to 350° C., thereby producing a molded article having a desired shape.

Since the polyimide resin composition of the present invention may be heat-molded by extrusion molding or the like at a relatively low temperature of from 290 to 350° C., the polyimide resin composition is excellent in molding processability and may be easily produced into a molded product having a desired shape. The temperature of the heat molding is preferably from 310 to 350° C.

The polyimide resin composition of the present invention, which is thermoplastic, has molding processability and has an excellent balance between heat resistance and mechanical strength. The polyimide resin composition also has good slidability, and thus can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like. The molded articles, which are excellent in heat resistance and mechanical strength, also can replace various metals including aluminum alloys and magnesium alloys.

EXAMPLES

The present invention will be described in more detail with reference to examples below, but the present invention is not limited thereto. Various measurements and evaluations in each Production Example, Example, and Reference Example were carried out in the following manners.

<Infrared Spectroscopy (IR Measurement)>

The IR measurement of the polyimide resin was performed with "JIR-WINSPEC 50", produced by JEOL, Ltd.

<Logarithmic Viscosity μ>

The polyimide resin was dried at from 190 to 200° C. for 2 hours, and then 0.100 g of the polyimide resin was dissolved in 20 mL of concentrated sulfuric acid (96%, produced by Kanto Chemical Co., Inc.) to form a polyimide resin solution, and the measurement was made at 30° C. with a Cannon-Fenske viscometer using the polyimide resin solution as a measurement sample. The logarithmic viscosity μ was obtained according to the following expression.

$$\mu=\ln(ts/t_0)/C$$

$t_0$: elapsed time for flowing concentrated sulfuric acid
ts: elapsed time for flowing polyimide resin solution
C: 0.5 g/dL <Melting Point, Glass Transition Temperature, Crystallization Temperature, and Exothermic Amount of Crystallization>

The melting point (Tm), the glass transition temperature (Tg), the crystallization temperature (Tc) and the exothermic amount of crystallization (ΔHm) of the polyimide resin were measured with a differential scanning calorimeter ("DSC-6220", produced by SII Nanotechnology, Inc.).

The polyimide resin was subjected to the following thermal history in a nitrogen atmosphere. The condition of the thermal history included the first heating (heating rate: 10° C./min), then cooling (cooling rate: 20° C./min), and then second heating (heating rate: 10° C./min).

The melting point (Tm) was determined by reading the peak top value of the endothermic peak observed in the second heating. The glass transition temperature (Tg) was determined by reading the value observed in the second heating. The crystallization temperature (Tc) was determined by reading the peak top value of the exothermic peak observed in cooling.

The exothermic amount of crystallization ΔHm (mJ/mg) was calculated from the area of the exothermic peak observed in cooling.

<Crystallization Half-Time>

The crystallization half-time of the polyimide resin was measured with a differential scanning calorimeter ("DSC-6220", produced by SII Nanotechnology, Inc.).

A polyimide resin having a crystallization half-time of 20 seconds or less was measured under such conditions that in a nitrogen atmosphere, the polyimide resin was held at 420° C. for 10 minutes for melting the polyimide resin completely, and then quenched at a cooling rate of 70° C./min, during which the time required from the appearance of the crystallization peak observed to the peak top thereof was calculated for determining the crystallization half-time.

<Weight Average Molecular Weight>

The weight average molecular weight (Mw) of the polyimide resin was measured with a gel permeation chromatography (GPC) measurement apparatus "Shodex GPC-101" produced by Showa Denko K.K. under the following conditions:

Column: Shodex HFIP-806M
Mobile phase solvent: HFIP containing 2 mM sodium trifluoroacetate
Column temperature: 40° C.
Flow rate of mobile phase: 1.0 mL/min
Specimen concentration: about 0.1 mass %
Detector: IR detector
Amount of injection: 100 μm
Calibration curve: standard PMMA <Heat Deformation Temperature (HDT)>

The polyimide resin composition obtained in each of Examples was used to prepare a molded article of 80 mm×10 mm×4 mm in thickness, which was used for measurement. A HDT tester "Auto-HDT3D-2" (produced by Toyo Seiki Seisaku-sho, Ltd.) was used to measure the heat deformation temperature under conditions including a distance between supports of 64 mm, a load of 1.80 MPa, and a heating rate of 120° C./hour.

<Bending Strength and Flexural Modulus>

The polyimide resin composition obtained in each of Examples was used to prepare a molded article of 80 mm×10 mm×4 mm in thickness prescribed in ISO 316, which was used for measurement. The bending test was performed with Bend Graph (produced by Toyo Seiki Seisaku-Sho, Ltd.) according to ISO 178 at a temperature of 23° C. and a testing speed of 2 mm/min to measure the bending strength and the flexural modulus.

<Specific Gravity>

The polyimide resin composition obtained in each of Examples was used to prepare a molded article of 80 mm×10 mm×4 mm in thickness, and the true specific gravity was measured with a true specific gravity meter.

[Production Example 1] Production of Polyimide Resin 1

500 g of 2-(2-methoxyethoxy)ethanol (produced by Nippon Nyukazai Co., Ltd.) and 218.12 g (1.00 mol) of pyromellitic dianhydride (produced by Mitsubishi Gas Chemical Company, Inc.) were introduced in a 2 L separable flask equipped with a Dean-Stark apparatus, a Liebig condenser tube, a thermocouple, and a four-paddle blade. After creation of a nitrogen flow, the mixture was agitated at 150 rpm so as to become a homogeneous suspended solution. On the other hand, 49.79 g (0.35 mol) of 1,3-bis(aminomethyl) cyclohexane (produced by Mitsubishi Gas Chemical Company, Inc., cis/trans ratio=7/3) and 93.77 g (0.65 mol) of 1,8-octamethylenediamine (produced by Kanto Chemical Co., Inc.) were dissolved in 250 g of 2-(2-methoxyethoxy)

ethanol with a 500 mL beaker, thereby preparing a mixed diamine solution. This mixed diamine solution was added gradually with a plunger pump. Heat was generated due to the drop addition, but the internal temperature was adjusted to be within the range of 40 to 80° C. The dropwise addition of the mixed diamine solution was carried out in a nitrogen flow state over the whole period. The number of rotations of the agitation blade was set to 250 rpm. After the completion of the dropwise addition, 130 g of 2-(2-methoxyethoxy) ethanol and 1.284 g (0.0100 mol) of n-octylamine (produced by Kanto Chemical Co., Inc.) as an end capping agent were added thereto, and the mixture was further agitated. At this stage, a pale yellow polyamic acid solution was obtained. Next, the agitation speed was set to 200 rpm, and the polyamic acid solution in the 2 L separable flask was then heated to 190° C. In this heating process, the deposition of a polyimide resin powder and dehydration associated with imidization were confirmed at a solution temperature of from 120 to 140° C. The solution was kept at 190° C. for 30 minutes, then allowed to cool to room temperature, and filtered. The obtained polyimide resin powder was washed with 300 g of 2-(2-methoxyethoxy)ethanol and 300 g of methanol, filtered, and then dried at 180° C. for 10 hours with a drier, thereby providing 317 g of a powder of polyimide resin 1.

The measurement of the IR spectrum of polyimide resin 1 showed the characteristic absorption of an imide ring ν(C═O) observed at 1768 and 1697 ($cm^{-1}$). The logarithmic viscosity was 1.30 dL/g, Tm was 323° C., Tg was 184° C., Tc was 266° C., the exothermic amount of crystallization ΔHm was 21.0 mJ/mg, the crystallization half-time was 20 seconds or less, and Mw was 55,000.

The composition and evaluation results of the polyimide resin in Production Example 1 are shown in Table 1. The values expressed in mol % of the tetracarboxylic acid component and the diamine component in Table 1 are values calculated from the charged amount of each component in production of the polyimide resin.

TABLE 1

| | | Tetracarboxylic acid component (mol % in the total tetracarboxylic acid component) | Diamine component (mol % in the total diamine component) | | (1)/{(1) + (2)} | Tm | Tg | Tc | Exothermic amount of crystallization ΔHm | Crystal-lization half-time | |
|---|---|---|---|---|---|---|---|---|---|---|---|
| | | PMDA | 1,3-BAC | OMDA | (mol %) | (° C.) | (° C.) | (° C.) | (mJ/mg) | (second) | Mw |
| Production Example 1 | Polyimide resin 1 | 100 | 35 | 65 | 35 | 323 | 184 | 266 | 21.0 | <20 | 55,000 |

Abbreviations in the Table 1 are as follows.

PMDA; pyromellitic dianhydride 1,3-BAC; 1,3-bis(aminomethyl)cyclohexane

OMDA; 1,8-octamethylenediamine

[Production and Evaluation of Polyimide Resin Composition 1; Heat Resistance and Mechanical Strength]

Example 1

Talc as an inorganic filler ("NANO ACE D-800" produced by Nippon Talc Co., Ltd.", average particle size 0.8 μm) was added to the polyimide resin 1 powder obtained in Production Example 1 at the rate mixed shown in Table 2, and sufficiently mixed therewith by dry blend. The resulting mixed powder was extruded at a barrel temperature of 350° C. and a screw rotation speed of 200 rpm with a co-rotating twin-screw extruder ("TEM37BS", produced by Toshiba Machine Co., Ltd.). In this operation, glass fiber ("ECS 03 T-786H", produced by Nippon Electric Glass Co., Ltd., average fiber diameter: 10.5 μm, average fiber length: 3 mm, sizing agent: urethane-base) was introduced in the extruder with a side feeder, mixed during melting, and extruded. The glass fiber was mixed at 20 mass % with respect to the whole amount of the polyimide resin composition.

A strand extruded from the extruder was cooled in water and then pelletized with a pelletizer ("SCF-150", produced by Isuzu Kakoki Co., Ltd.). The resulting pellets (polyimide resin composition) were dried at 150° C. for 10 hours and then used in injection molding.

The injection molding was performed at a barrel temperature of 355° C., a mold temperature of 210° C., and a molding cycle of 50 seconds with an injection molding machine ("ROBOSHOT α-S30iA", produced by Fanuc Corporation), thereby preparing a molded article of a predetermined shape to be used for various evaluations.

The prepared molded article was used to perform various evaluations according to the aforementioned methods. The results are shown in Table 2.

Examples 2 to 10

A polyimide resin composition was produced and subjected to various evaluations according to the same method as in Example 1 except that the amount of the polyimide resin 1 mixed, the type and amount of glass fiber mixed, and the amount of talc mixed were changed as shown in Table 2. The results are shown in Table 2.

As can be seen from the comparison between Examples 1 and 2 and the comparison between Examples 4 and 5, when talc as the inorganic filler is mixed in addition to the polyimide resin (A) and the glass fiber (B), the HDT increases by 8 to 12° C. to thereby improve the heat resistance. It is assumed that this is because the talc exerts an effect as that of a crystal nucleating agent.

TABLE 2

| | | Glass fiber (B) | | | Talc | Evaluation results of resin composition | | | |
|---|---|---|---|---|---|---|---|---|---|
| | Polyimide resin (A) Amount mixed (mass %) | Grade | Sizing agent | Amount mixed (mass %) | Amount mixed (mass %) | HDT (° C.) | Bending strength (MPa) | Flexural modulus (GPa) | Specific gravity (g/cm$^3$) |
| Example 1 | 79.5 | T-786H | Urethane-based | 20 | 0.5 | 245 | 200 | 6.5 | 1.44 |
| Example 2 | 80 | T-786H | Urethane-based | 20 | — | 237 | 190 | 6.3 | 1.43 |
| Example 3 | 70 | T-786H | Urethane-based | 30 | — | 274 | 242 | 8.7 | 1.54 |
| Example 4 | 50 | T-786H | Urethane-based | 50 | — | 280 | 273 | 15.6 | 1.72 |
| Example 5 | 49 | T-786H | Urethane-based | 50 | 1 | 292 | 274 | 15.5 | 1.72 |
| Example 6 | 40 | T-786H | Urethane-based | 60 | — | 285 | 266 | 19.5 | 1.85 |
| Example 7 | 30 | T-786H | Urethane-based | 70 | — | 287 | 234 | 23.6 | 1.97 |
| Example 8 | 49 | T-781DE | Urethane-based | 50 | 1 | 292 | 296 | 14.9 | 1.72 |
| Example 9 | 49.5 | T-747H | Urethane/epoxy-based | 50 | 0.5 | 289 | 250 | 15.6 | 1.72 |
| Example 10 | 49 | T-747H | Urethane/epoxy-based | 50 | 1 | 288 | 251 | 15.8 | 1.73 |

The details of each components shown in Table 2 are as follows.

<Glass Fiber (B)>

"T-786H"; "ECS 03 T-78611", produced by Nippon Electric Glass Co., Ltd., average fiber diameter: 10.5 μm, average fiber length: 3 mm, sizing agent: urethane-based "T-781DE"; "ECS 03 T-781DE", produced by Nippon Electric Glass Co., Ltd., average fiber diameter: 6.5 μm, average fiber length: 3 mm, sizing agent: urethane-based "T-747H"; "ECS 03 T-74711" produced by Nippon Electric Glass Co., Ltd., average fiber diameter: 10.5 μm, average fiber length: 3 mm, sizing agent: urethane/epoxy-based <Talc>

"NANO ACE D-800", produced by Nippon Talc Co., Ltd., average particle size: 0.8 μm.

The following is revealed from Table 2.

The polyimide resin compositions of Examples 1 to 10 are excellent in molding processability as well as having a good balance between heat resistance and mechanical strength because of mixing a polyimide resin containing particular different polyimide structural units combined at a particular ratio and glass fiber.

As can be seen from the results from Examples 2 to 4 and 6 to 7, when the amount of the glass fiber (B) mixed in the polyimide resin composition is 30 mass % or more, the heat deformation temperature (HDT) is significantly enhanced and the heat resistance is excellent. Among these, when the amount of the glass fiber (B) mixed in the polyimide resin composition is in the range of 30 to 60 mass % and particularly in the vicinity of 50 mass %, both the HDT and bending strength tend to increase, and the heat resistance and mechanical strength are excellent.

As can be seen from the comparison among Examples 5, 8, and 10, when the sizing agent for the glass fiber to be used in the polyimide resin composition is a urethane-based sizing agent (Examples 5 and 8), the heat resistance and bending strength are more enhanced than those in the case of the urethane/epoxy-based sizing agent (Example 10).

Also in the polyimide resin composition of Example 7, in which the polyimide resin 1 is used as the component (A) and the amount of the glass fiber (B) mixed was caused to increase up to 70 mass %, it was shown that good molding processability can be maintained without impairing the flowability on injection molding. This is ascribable to the fact that the original molding processability of the polyimide resin (A) described in the present application is extremely good.

[Evaluation of Polyimide Resin Composition 2: Slidability]

The slidability of the polyimide resin composition of Example 5 and the polyimide resin 1 obtained in Production Example 1 (taken as Reference Example 1) was evaluated in accordance with the following method.

<Limit PV Value>

The limit PV value (MPa·m/s) was measured according to JIS K7218 (1986)-method A, at normal temperature (25° C.), using a mating material of SUS304, at test speeds: 0.5 m/s, 0.9 m/s, and 2.0 m/s.

<Specific Abrasion Loss and Coefficient of Dynamic Friction>

A slidability test was conducted according to JIS K7218 (1986)-method A, at normal temperature (25° C.), using a mating material of SUS304, under conditions of a test load: 50 N, a test speed: 0.5 m/s, and a slide distance: 3 km, and the specific abrasion loss and coefficient of dynamic friction were measured.

TABLE 3

| | Polyimide resin (A) Type | Glass fiber (B) Grade | Glass fiber (B) Sizing agent | Glass fiber (B) Amount mixed (mass %) | Talc Amount mixed (mass %) | Limit PV value 0.5 m/s (MPa · m/s) | Limit PV value 0.9 m/s (MPa · m/s) | Limit PV value 2.0 m/s (MPa · m/s) | Specific abrasion loss ($10^{-9}$ $cm^3$/(kgf · m)) | Coefficient of dynamic friction |
|---|---|---|---|---|---|---|---|---|---|---|
| Example 5 | Polyimide resin 1 | T-786H | Urethane-based | 50 | 1 | 0.73 | 0.81 | 1.20 | 116 | 0.27 |
| Reference Example 1 | Polyimide resin 1 | — | — | — | — | 0.43 | 0.32 | 0.40 | 767 | 0.51 |

It can be seen from Table 3 that the polyimide resin composition of the present invention obtained by blending the predetermined polyimide resin (A) and glass fiber is also excellent in slidability.

INDUSTRIAL APPLICABILITY

The polyimide resin composition of the present invention is excellent in molding processability as well as having a good balance between heat resistance and mechanical strength. The polyimide resin composition of the present invention can be applied in, for example, various industrial members for automobiles, railway, aviation, and the like, members for household electrical products, or enclosures therefor and the like. Specifically, the polyimide resin composition can be applied in gears, bearings, cutting members, screws, nuts, packings, IC sockets for inspection, belts, covering materials for electrical wire and the like, cover-lay films, members for semiconductor manufacturing apparatuses, medical instruments, covering materials for fishing rods, reels, and the like, stationery, and the like. The molded articles, which are excellent in heat resistance and mechanical strength, also can replace various metals including aluminum alloys and magnesium alloys.

The invention claimed is:

1. A polyimide resin composition, comprising:

a glass fiber; and a polyimide resin mixed with the glass fiber and comprising a repeating structural unit of formula (1) and a repeating structural unit of formula (2), wherein a content ratio of the repeating structural unit of the formula (1) with respect to the total of the repeating structural unit of the formula (1) and the repeating structural unit of the formula (2) is 25 mol % or more and less than 40 mol %, and the formula (1) and the formula (2) are (1)

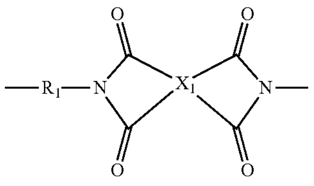

(2)

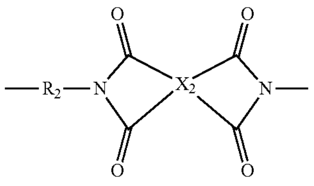

where $R_1$ is a divalent group of formula (R1-3), $R_2$ is a divalent chain aliphatic group having from 8 to 10 carbon atoms, $X_1$ and $X_2$ are a tetravalent group of formula (X-5), (R1-3)

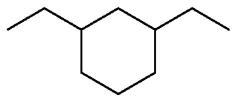

(X-5)

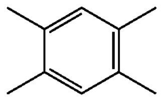

wherein an amount of the glass fiber mixed in the polyimide resin composition is in a range of 30 to 65 mass % relative to a total mass of the polyimide resin composition, wherein an average fiber length of the glass fiber is 3 to 6 mm, and wherein the glass fiber is surface-treated with at least one selected from the group consisting of a urethane-based sizing agent and a urethane/epoxy-based sizing agent.

2. The polyimide resin composition according to claim 1, wherein the glass fiber is surface-treated with a urethane-based sizing agent.

3. The polyimide resin composition according to claim 1, wherein an inorganic filler other than the glass fiber is further mixed.

4. The polyimide resin composition according to claim 3, wherein an amount of the inorganic filler mixed is 0.05 to 15 mass % relative to a total mass of the polyimide resin composition.

5. A molded article, comprising:

the polyimide resin composition of claim 1.

6. The polyimide resin composition according to claim 1, wherein the amount of the glass fiber mixed in the polyimide resin composition is 50 to 65 mass % relative to a total mass of the polyimide resin composition.

7. The polyimide resin composition according to claim 2, wherein an inorganic filler other than the glass fiber is further mixed.

8. The polyimide resin composition according to claim 7, wherein an amount of the inorganic filler mixed is 0.05 to 15 mass % relative to a total mass of the polyimide resin composition.

9. A molded article, comprising:

the polyimide resin composition of claim 2.

10. The polyimide resin composition according to claim 2, wherein the amount of the glass fiber mixed in the polyimide resin composition is 50 to 65 mass % relative to a total mass of the polyimide resin composition.

11. A molded article, comprising:

the polyimide resin composition of claim 3.

12. The polyimide resin composition according to claim 3, wherein the amount of the glass fiber mixed in the polyimide resin composition is 50 to 65 mass % relative to a total mass of the polyimide resin composition.

13. A molded article, comprising:

the polyimide resin composition of claim 6.

14. The polyimide resin composition according to claim 4, wherein the amount of the glass fiber mixed in the polyimide resin composition is 50 to 65 mass % relative to a total mass of the polyimide resin composition.

* * * * *